United States Patent [19]

Brylla et al.

[11] Patent Number: 4,809,459

[45] Date of Patent: Mar. 7, 1989

[54] BUILDING AND GARDEN EDGING

[76] Inventors: Arnold Brylla, Rte. 1, Box 83; Roger J. Flink, 310 Logelin Dr., both of Reedsburg, Wis. 53959

[21] Appl. No.: 925,675

[22] Filed: Oct. 31, 1986

[51] Int. Cl.⁴ .............................................. A01G 1/08
[52] U.S. Cl. ........................................ 47/33; 52/102
[58] Field of Search ................... 47/33, 23, 24, 25, 32; 52/102; 16/227, 224, 225, DIG. 13

[56] References Cited

U.S. PATENT DOCUMENTS

| | | | |
|---|---|---|---|
| 3,378,949 | 4/1968 | Dorris | 47/33 |
| 3,438,146 | 4/1969 | Nickerson | 47/33 |
| 3,484,989 | 12/1969 | Lazinsky | 47/30 |
| 3,495,352 | 2/1970 | Sbare | 47/33 |
| 3,545,127 | 12/1970 | Jensen | 47/33 |
| 4,154,362 | 9/1979 | McKenney | 16/225 |
| 4,219,941 | 9/1980 | Hav | 47/33 |
| 4,321,769 | 3/1982 | Tesbo et al. | 47/33 |
| 4,644,685 | 2/1981 | Tesbo et al. | 47/33 |

FOREIGN PATENT DOCUMENTS

| | | | |
|---|---|---|---|
| 2907427 | 8/1980 | Fed. Rep. of Germany | 47/33 |
| 3023309 | 1/1982 | Fed. Rep. of Germany | 47/33 |

OTHER PUBLICATIONS

"Kamb" Rasenunfassung, 47/32, 6/6/77.

Primary Examiner—Richard J. Johnson
Attorney, Agent, or Firm—Donald Cayen

[57] ABSTRACT

An L-shaped lawn and garden edging has a leg that is inserted into the ground and a flange that rests on the ground to impede plant growth under the flange. When the edging is inserted into the ground adjacent a building or other above ground object, the grass adjacent the building need not be hand trimmed after the lawn is mowed with a mower. The present invention includes an edging having an upstanding retainer section joined to the junction of the leg and flange. The retainer section is useful for retaining selected above ground garden materials into desired areas. The flange may be slit to permit bending the edging into curved configurations. The ends of the edgings may be cut at an angle and placed into end facing contact to bound multi-sided areas. In a modified embodiment, the flange is pivotally connected to the leg by a hinge of material. The flange has a tongue that is selectively engageable with a groove in the leg to hold the flange rigidly to the leg and disengageable from the groove to permit folding the edging. In a further modified embodiment, the flange is a loose piece that has a pair of tongues that are slideable into a dovetail groove in the leg to permit selective use as a rigid edging and to permit rolling the flange and edging.

22 Claims, 4 Drawing Sheets

BUILDING AND GARDEN EDGING

BACKGROUND OF THE INVENTION

1. Field of the Invention

This invention pertains to lawn and garden care, and more particularly to apparatus for controlling the locations of selected lawn and garden plants and materials.

2. Description of the Prior Art

It is well known that power and hand lawn mowing equipment can cut the grass to within only a few inches of buildings, fences, and other above grade objects. The grass adjacent those objects must then be trimmed with another tool, whether hand or power. Such trimming is a tedious and tiresome chore, especially if manual clippers are used.

Various equipment has been designed to eliminate lawn trimming. For example, U.S. Pat. No. 3,484,989 shows an edging strip manufactured as a plastic channel in combination with narrow L-shaped metal brackets for supporting the channel. The plastic channel and metal brackets are attached to each other by means of interfitting protuberances and recesses. It is evident that the multi-component construction of U.S. Pat. No. 3,484,989 renders it undesirably expensive. Further, it is cumbersome and time consuming to assemble the brackets and channels prior to use.

U.S. Pat. No. 4,321,769 discloses an edging strip having a vertical panel with two horizontal lips and a crowned cap. The cap and lips are subject to breakage as lawn mowers pass repeatedly over and bend the cap and force the vertical panel deeper into the ground.

Edging in the form of lengths of flat plastic strips having a semi-circular bead along one edge, in combination with metal anchoring stakes, is also known. Such edging is unsatisfactory, however, because it is expensive, and because it tends to heave easily due to frost. Consequently, the edging must be relaid each spring; otherwise the gardner risks striking the uplifted edging with his lawn mower.

An additional disadvantage of prior edging strips is that they are limited to retaining and separating dirt, gravel, and plants lying at or below ground level. Wood boards and railroad ties are sometimes used for making raised gardens and for separating above grade decorative materials, but such boards and ties are bulky and unsightly. In addition, the boards and ties require separate edging strips to eliminate lawn trimming alongside them.

Thus, a need exists for a product that is capable of simultaneously separating components below ground level, eliminating grass trimming adjacent an above-ground object, and retaining above ground materials within selected areas.

SUMMARY OF THE INVENTION

In accordance with the present invention, a versatile and inexpensive edging is provided that greatly facilitates lawn and garden maintenance. This is accomplished by apparatus that includes a heavy duty vertical below ground member connected to a horizontal above-ground flange.

The edging is of a generally L-shaped cross section. The longer leg is designed to be inserted directly into the ground flush against a building foundation with minimum disturbance of the adjacent soil. For that purpose, the outside surface of the longer leg is smooth. To help retain the edging in the ground against frost heaval, the opposite leg surface may be formed with one or more barbed ridges.

The shorter leg of the edging forms the horizontal flange that preferably has nonparallel side surfaces. The undersurface is approximately perpendicular to the long leg, but the flange top surface forms an acute angle with the longer leg. Consequently, the junction between the flange and leg is relatively thick to create a heavy duty edging.

Further in accordance with the present invention, the edging may include a retainer section that permanently retains lawn and garden material in place above ground level. The retainer section preferably is in line with the leg, with the smooth side of the leg and the outside surface of the retainer section lying in a common plane. The thickness of the retainer section at the junction with the flange may be greater than the thickness at the retainer section free edge, thereby contributing to the strength, rigidity, and attractiveness of the invention. When used as an above grade retainer, the flange of the edging operates to inhibit plant growth beneath the flange, so that the edging performs double duty in retaining above ground materials and eliminating lawn trimming.

It is a feature of the present invention that individual edging components can be modified for custom application to a lawn or garden. For example, the flanges may be slit to permit bending the edging into curved configurations. The ends of relatively short lengths of the edging can be cut at an angle and placed in abutting contact to create non-rectangular decorative areas.

In a modified embodiment of the present invention, the flange is designed and manufactured in a manner that permits the lawn and garden edging to be rolled for easy storage and transportation. For that purpose, the flange and leg are connected by a hinge of material. The hinge is preferably located at the junction of the undersurface of the flange and the inside surface of the leg. The top surface of the flange above the hinge terminates in an upstanding tongue that runs the length of the flange. The lower end of the retainer section at the junction with the flange and leg is formed with a longitudinally extending groove that is complementary in shape with the flange tongue. To roll the edging, the flange is pivoted downwardly about the hinge toward the leg. The tongue pulls out of the retainer section groove, so that the flange lies against the inside surface of the leg. At installation, the flange is pivoted to a position perpendicular to the leg and the tongue is snapped into place within the retainer section groove to create a rigid edging.

In another rollable version of the present invention, the leg and flange are made as two pieces. In that embodiment, the flange inner end is fabricated with two opposed and preferably tapered tongues that extend perpendicularly to the plane of the flange. The leg is formed with a complementary groove to thereby create a dovetail connection between the leg and flange. With the flange and leg separated, they may be rolled together or separately. When the flange is slid into the leg groove from the end, the tongues and groove interlock, thereby causing the edging to function as a single rigid structure for use in the same manner as the one piece designs.

Other features, aims, and advantages of the inventon will become apparent to those skilled in the art upon reading the detailed description.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
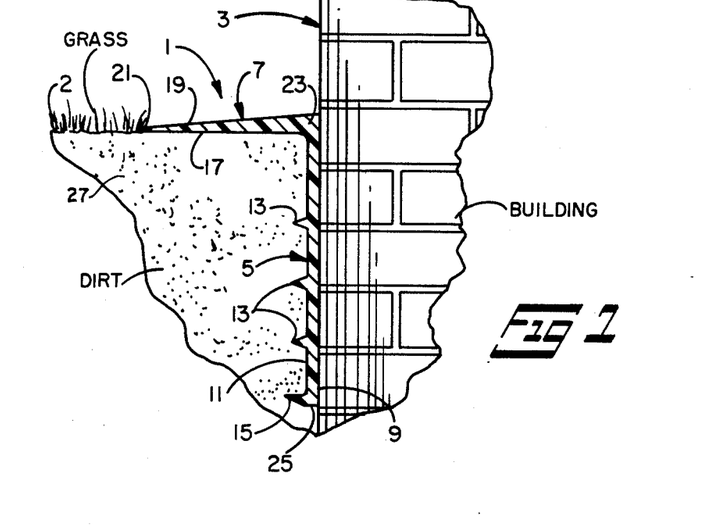
FIG. 1 is a cross sectional view of the lawn and garden edging of the present invention in place against the side of a building.
Figure 2:
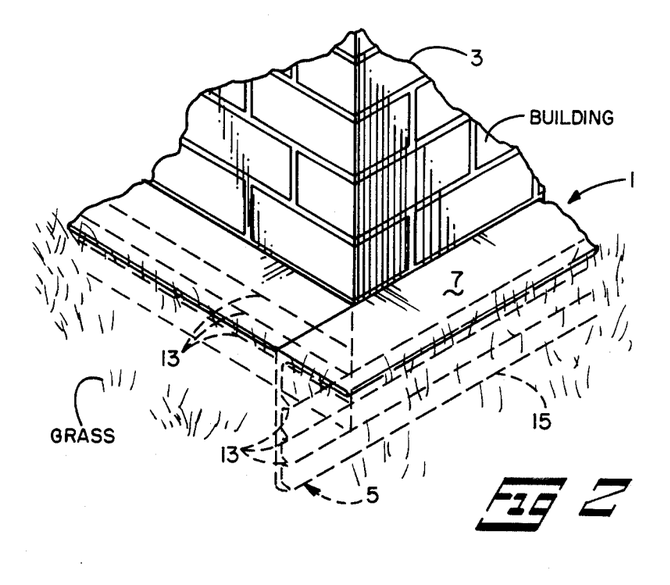
FIG. 2 is a perspective view of the lawn and garden edging in place at an outside corner of a building.

Referring to FIGS. 1 to 2, a lawn and garden edging 1 is illustrated that includes the present invention. The edging is useful for controlling the growth and location of lawn and garden plants and materials, but it will be understood that the invention is not limited to outdoor applications.

The edging 1 is generally L-shaped, comprising an elongated vertical leg 5 to which is integrally joined a horizontal flange 7. The leg 5 has two generally parallel side surfaces, an outside surface 9 and an inside surface 11. The outside surface 9 is preferably smooth. The inside surface 11 defines three rows of barbed ridges 13 that protrude from and extend longitudinally along the leg. A fourth barbed ridge 15 is located adjacent the leg free edge 25 and is similar to the other rows of barbs 13, but barbed ridge 15 protrudes slightly more than the others.

The flange 7 has an undersurface 17 that is approximately perpendicular to the leg inside surface 11. The flange top surface 19 is preferably nonparallel with the undersurface 17. Rather, surface 19 diverges from the free edge 21 toward the junction 23 of the leg and flange. Accordingly, the material thickness at the junction 23 is greater than the thickness of the flange at the free edge 21.

The edging 1 may be manufactured as continuously molded polyethylene plastic, or as extruded polyethylene plastic. That material is strong, light, highly resistant to moisture and sunlight, and economical. Black and green are the most desirable colors, with black being the first choice.

The continuously molded or extruded edging 1 is conveniently cut into convenient lengths for easy consumer handling. Although the dimensions of the leg height and flange width may vary within rather wide ranges, the preferred leg height is approximately 4.5 to 5 inches. The minimum thickness of the leg is approximately 0.12 inches, and the barbed ridges 13 protrude approximately 0.13 inches from the inside surface 11. The lowermost barbed ridge 15 may protrude approximately 0.18 inches to 0.25 inches from the leg inside surface. The width of the flange is desirably approximately 3 inches. As mentioned, the flange surfaces 17 and 19 are not parallel. Rather, the flange thickness at the free edge 21 is approximately 0.06 inches, and the thickness at the junction 23 is approximately 0.25 inches. Consequently, the flange is very strong and able to resist bending and flexing.

To use the edging 1 of the present invention, the ground is opened with a straight spade to form a narrow slit along the building 3 or other above ground object. The leg 5 is inserted into the narrow slit until the flange 7 contacts the ground. The strong construction of the edging together with the multiple short barbed ridges 13 and 15 permit installation with only minimal soil disturbance. Consequently, the ground around the leg remains undisturbed to thereby resist edging removal. The barbed ridges and assist to retain the edging in the ground. With the edging in place, grass or other plant growth under the flange is impeded. Accordingly, a lawn mower is able to cut the grass up to the flange edge 21, thereby eliminating the need for triming close to the building. The sturdy construction of the flange, together with the structural feature of the flange undersurface 17 being in facing contact with the ground, render the edging capable of giving long service in supporting lawn mower wheels. It will be understood, of course, that the edging is not confined to use alongside buildings; the edging can be used effectively with other above ground objects as cemetery monuments.

Figures 3, 4, 5:
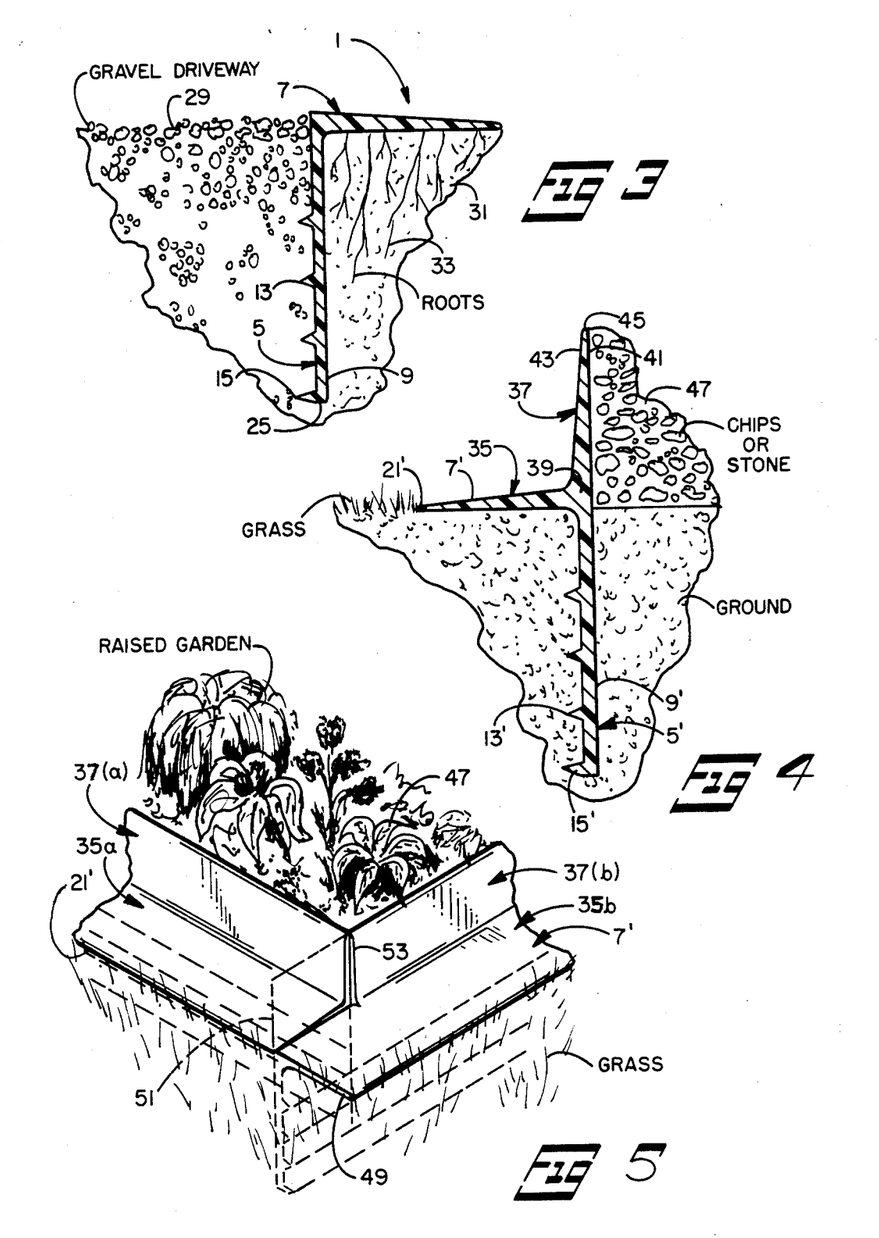
FIG. 3 is a cross sectional view of the lawn and garden edging of the present invention in place alongside a gravel driveway.
FIG. 4 is a cross sectional view of a modified embodiment of the lawn and garden edging of the present invention in place against a raised garden.
FIG. 5 is a perspective view of the modified edging of FIG. 4 in use with a raised garden.

Turning to FIG. 3, the versatility of the edging 1 of the present invention is demonstrated. The edging is shown in place along side a gravel driveway 29. The edging serves to create a definite boundary between the driveway 29 and the adjacent lawn portion 31. Moreover, the leg 5 blocks plant roots 33 from encroaching into the driveway and thereby eliminates unsightly clumps of grass or weeds in the gravel.

Referring to FIG. 4, a modified embodiment of the present invention is disclosed. The modified edging 35 has a leg 5' that is substantially similar to the leg 5 of the edging 1. Leg 5' includes longitudinally extending barbed ridges 13' and 15'. Edging 35 further includes a flange 7' that is substantially similar to the flange 7 of the edging 1. Further in accordance with the present invention, edging 35 also includes an upstanding retainer section 37 that is joined to the flange 7' and leg 5' at a junction region 39. The retainer portion 37 is coextensive in length with the flange and leg, and has an outside surface 41 that is coplaner with the outside surface 9' of the leg. The retainer portion also has an inside surface 43 that is nonparallel with the outside surface 41, such that the thickness of the retainer portion tapers from the junction region 39 to the free edge 45. Consequently, the retainer section is both strong and attractive.

In FIG. 4, the edging 35 is shown in place to bound a raised garden or other selected area 47. For that purpose, the retainer portion 37 preferably extends approximately 2 to 2.5 inches above the junction 39. The retainer section is thus able to retain materials such as bark, mulch, or decorative stones within a well defined area. Simultaneously, the edging, by means of the flange 7', inhibits grass or other plant growth along the raised garden 47. The edging thereby serves the additional purpose of eliminating grass trimming around the raised garden.

FIG. 5 illustrates the structure of the edging 35 at an outside corner of a bounded area 47. A first edging, labeled 35a, is inserted into the ground at the desired place. A second edging, labeled 35b, is inserted into place such that end 49 of the flange 7' is flush with the free edge 21' of the first edging 35a. Then a rectangular piece 51 is cut from the retainer section 37b such that a new retainer section end 53 is created that neatly matches the front surface 43 of the retainer section on edging 35a.

Figure 6:
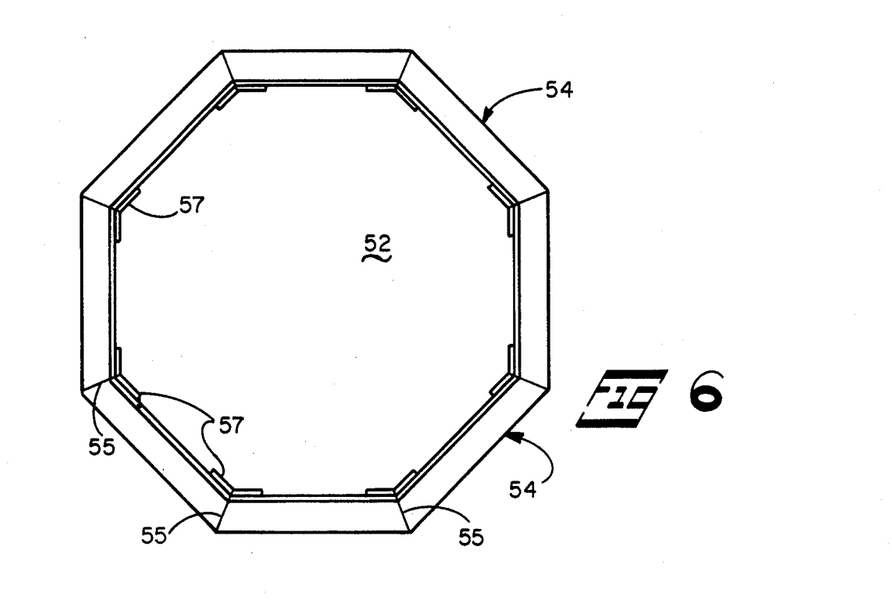
FIG. 6 is a top view of the present invention arranged into a hexagonal shape.

FIG. 6 illustrates a continuous multi-sided area 52 bound by a set of eight edgings 54 arranged in a octagonal shape. Both ends 55 of each edging 54 are cut at an angle of 22.5 degrees, so that the ends 55 are in facing contact when the edgings are in place. A connector piece 57 is used at each set of ends 55 to help retain the edgings in proper location prior to inserting them into the ground. The connector pieces 57 may be secured to the edgings by any suitable means. Preferably, the connector pieces are bent to the same angle as the edging ends and straddle the joints between adjacent edgings. It is anticipated that a quantity of relatively short edgings 54 will be provided together with the requisite number of connector pieces in kit form. It will be appreciated that the ends 55 may be cut at different angles than 22.5 degrees to form outlines other than octagonal. Moreover, the edgings 54 need not entirely enclose an area, but may only partially bound a selected area.

Figure 7:
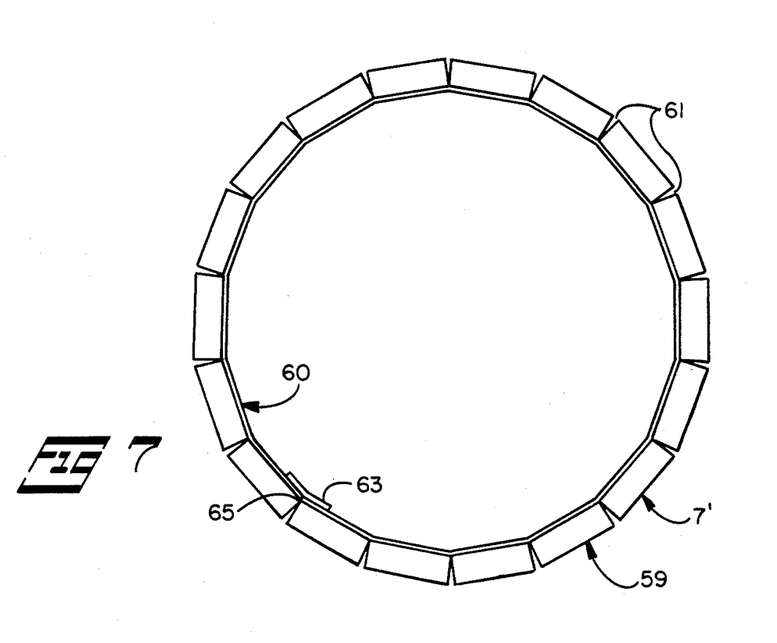
FIG. 7 is a top view of the present invention arranged into a circular shape.

Turning to FIG. 7, a modified edging 59 is shown that enables the gardener to create a generally circular or other curved shape. The flange 7' of a length of edging 59 is slit at several locations 61. The slits 61 enable the edging to be bent into a generally round or other curved configuration. A connector piece 63 may be used to join the two edging ends 65 together.

Figure 8:
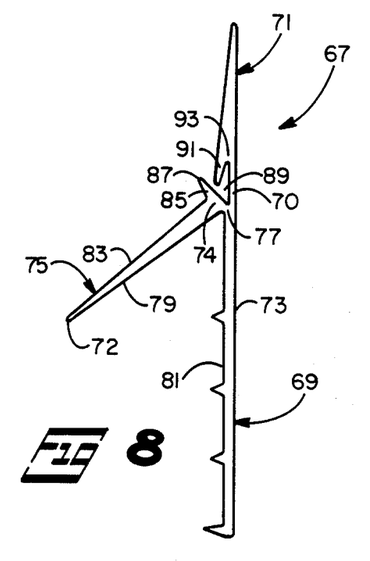
FIG. 8 is a side view of a modified embodiment of the present invention that permits rolling thereof and that is shown in the rollable mode.
Figure 9:
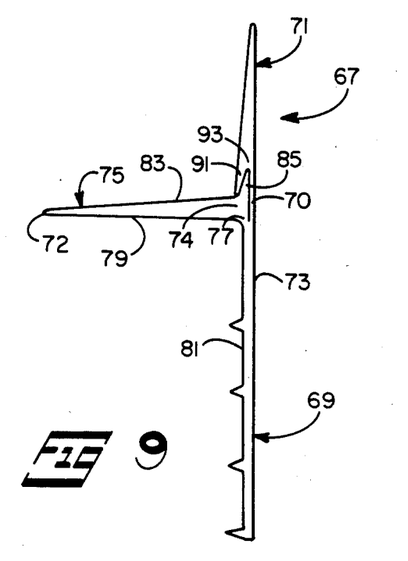
FIG. 9 is a side view of the modified embodiment of FIG. 8 shows in the rigid operative mode.

Turning to FIGS. 8 and 9, a modified edging 67 is illustrated that permits rolling the edging for convenient handling. The edging 67 includes a leg 69 that is generally similar to the legs 5 and 5' described previously. The modified edging 67 further includes an upstanding retainer section 71 that is joined to the leg 69 in central region 70. The leg and retainer section 71 form a coplaner outside surface 73.

Connected to the central portion 70 between the leg 69 and retainer section 71 is a flange 75. The flange 75 therefore has a free edge 72 and a hinge end 74. The flange hinge end 74 is connected by a hinge 77 of material that is preferably located at the junction of the flange undersurface 79 and the leg front surface 81. The flange top surface 83, which preferably is not parallel to the undersurface 79, terminates in an upstanding tongue 85 that preferably has a rather sharp pointed edge 87. The central region 70 between the leg and retainer section is formed with a longitudinal groove 89 that is complementary in shape to the tongue 85. In FIG. 8, the flange 75 is shown in an inoperative mode and partially pivoted toward the leg. It will be understood that the flange is capable of being fully pivoted against the leg to thereby enable the edging to be rolled.

To convert the inoperative edging 67 of FIG. 8 into the operative mode of FIG. 9 for inserting into the ground, the flange 75 is pivoted to the position of FIG. 9, wherein the flange tongue 85 engages the groove 89. The flap of groove material 91 is pulled back from the groove to allow the tongue to enter the groove. The thickness of the retainer section in region 93 adjacent the groove is greater than the corresponding thickness of the junction region 39 of the edging 35 of FIG. 4. When the edging 67 is in the operative mode of FIG. 9, the flange, retainer section, and leg are rigidly joined so as to function identically with the edging 35.

Figure 10:
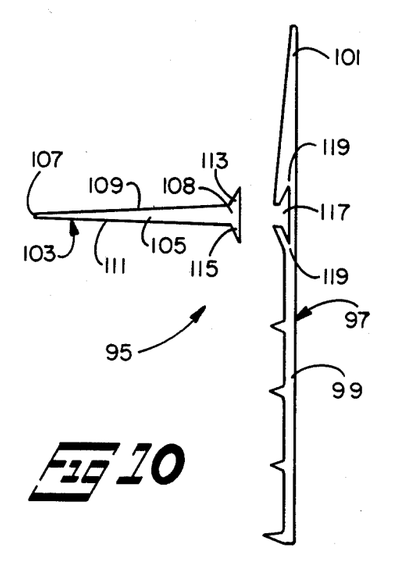
FIG. 10 is an exploded side view of a further modified rollable embodiment of the present invention showing the components thereof in a mode suitable for rolling.
Figure 11:
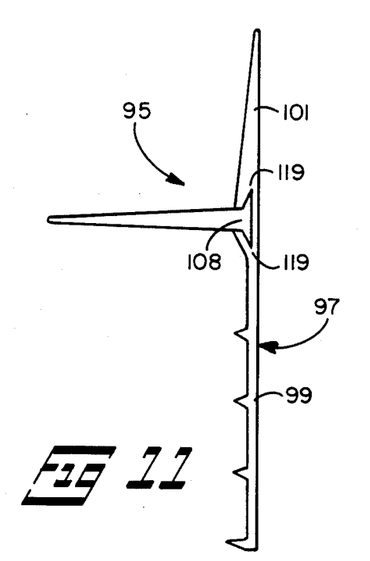
FIG. 11 is a side view of the modified embodiment of FIG. 10, but showing the components in an assembled operative mode.

Referring next to FIGS. 10 and 11, a two piece edging 95 according to the present invention is illustrated. The first piece 97 of the edging 95 is comprised of a leg 99 and a retainer 101. The leg 99 and retainer 101. The leg 99 and retainer 101 may be generally similar to the leg 69 and retainer section 71 described previously with respect to FIGS. 8 and 9. The second piece 103 of the modified edging 95 is a flange 105. The flange 105 has an outer free edge 107, an inner end 108, and non-parallel top and undersurfaces 109 and 111, respectively. The inner end 108 terminates in tongues 113 and 115 that extend approximately perpendicular to the plane of the flange.

The first edging piece 97 is fabricated with a groove 117 in the central region 119 between the leg 99 and retainer 101. The groove has a shape that is complementary to the shape of the tongues 113. In the preferred construction, the tongues are tapered, so that the tongues and groove form a dovetail connection. The material in the central region 119 surrounding the groove 117 is slightly thicker than the corresponding junction region 39 of the single piece edging 35 described previously.

In FIG. 10, the flange 105 is shown in an inoperative mode disassembled from the first edging piece 97. In that mode, the flange and first piece are rollable, either together or separately. To convert the two pieces 97 and 103 into a rigid edging 95, the flange tongues 113 and 115 are slid endwise into the groove 117 of the first piece. When assembled, the edging 95 is operable as a rigid edging similar to the previously described edgings 35 and 67.

Thus, it is apparent that there has been provided, in accordance with the invention, a lawn and garden edging that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A lawn and garden edging comprising:
   a. an elongated leg having generally parallel inside and outside surfaces, the outside surface being substantially smooth and the inside surface defining at least one barbed ridge extending longitudinally therealong; and
   b. an elongated flange coextensive with the leg and having a substantially smooth undersurface and top surface and being integrally joined to the leg to form a coextensive junction therewith, the outside surface of the leg and the top surface of the flange being joined directly to each other along the junction to create a continuous generally L-shape with the leg and flange having respective free edges, the flange undersurface being substantially flat for the full length thereof between the junction and the flange free edge, and wherein:

c. there is at least one first barbed ridge protruding a first distance from and extending longitudinally along the leg inside surface intermediate the leg free edge and the flange; and d. there is a second barbed ridge extending longitudinally along the leg adjacent the free edge thereof, the second barbed ridge protruding from the leg inside surface to a distance greater than the first distance of the first barbed ridge, so that the leg free edge may be inserted into the ground with the smooth outside surface against a building to place the flange in contact with the ground to thereby inhibit plant growth alongside the building.

2. The edging of claim 1 wherein the flange top surface is nonparallel to the undersurface, the under and top surfaces diverging from the flange free edge toward the junction of the flange and leg, so that the flange has a thickness and strength at the junction with the leg greater than at the flange free edge.

3. The edging of claim 3 wherein:
a. the leg is approximately 4.5 inches to 5 inches high;
b. the flange is approximately 3 inches wide;
c. the first barbed ridge protrudes approximately 0.13 inches from the leg inside surface;
d. the second barbed ridge extends approximately 0.25 inches from the leg inside surface; and
e. the flange thickness at the free edge is approximately 0.06 inches and the flange thickness at the junction with the leg is approximately 0.25 inches.

4. A lawn and garden edging comprising:
a. an elongated planar vertical leg having opposed free ends and generally parallel inside and outside surfaces, the outside surface being generally smooth and the inside surface defining a plurality of barbed ridges extending longitudinally along the inside surface, wherein the barbed ridges of the leg inside surface comprise at least one first barbed ridge that protrudes approximately 0.13 inches from the leg inside surface and a second barbed ridge that protrudes approximately 0.25 inches from the leg inside surface, the second barbed ridge being adjacent the leg free edge;
b. a single elongated flange coextensive in length with the leg and having an undersurface and a top surface, the flange being joined to the leg inside surface to create respective leg and flange free edges; and
c. an upstanding elongated retainer section coextensive in length with the leg and flange and having an inside surface and an outside surface, the retainer section being joined to the leg to create a retainer section free edge, the retainer section outside surface being coplanar with the leg outside surface, and wherein:
d. the flange is rigidly and permanently joined to and extends from the leg at a right angle thereto to form a junction with the leg and the flange; and
e. the flange top and undersurfaces diverge uniformly and continuously from the flange free edge to the junction of the flange and leg, so that the edging forms a generally T-shaped cross section and the leg can be inserted into the ground to contact the flange with the ground to impede plant growth under the flange and the retainer section can retain materials in selected locations above the ground.

5. A lawn and garden edging comprising:
a. an elongated planar vertical leg having opposed free ends and generally parallel inside and outside surfaces, the outside surface being generally smooth and the inside surface defining a plurality of barbed ridges extending longitudinally along the inside surface, wherein the barbed ridges of the leg inside surface comprise at least one first barbed ridge that protrudes approximately 0.13 inches from the leg inside surface and a second barbed ridge that protrudes approximately 0.25 inches from the leg inside surface, the second barbed ridge being adjacent the leg free edge;
b. a single elongated flange coextensive in length with the leg and having an undersurface and a top surface, the flange being joined to the leg inside surface to create respective leg and flange free edges; and
c. an upstanding elongated retainer section coextensive in length with the leg and flange and having an inside surface and an outside surface, the retainer section being joined to the leg to create a retainer section free edge, the retainer section outside surface being coplaner with the leg outside surface, wherein the retainer section outside the inside surfaces diverge from the free edge toward the junction of the flange, leg, and retainer section, so that the edging forms a generally T-shaped cross section and the leg can be inserted into the ground to contact the flange with the ground to impede plant growth under the flange and the retainer section can retain materials in selected locations above the ground.

6. The edging of claim 5 wherein:
a. the leg is approximately 4.5 inches to 5 inches high;
b. the flange is approximately 3 inches wide; and
c. the height of the retainer section is approximately 2 inches to 2.5 inches.

7. The edging of claim 6 wherein:
a. the flange thickness is approximately 0.06 inches at the free edge thereof and approximately 0.25 inches at the junction with the retainer section and leg; and
b. the retainer section thickness is approximately 0.06 inches at the free edge thereof and approximately 0.25 inches at the junction of the flange and the retainer section.

8. A lawn and garden edging comprising:
a. an elongated vertical leg having generally parallel inside and outside surfaces, the outside surface being generally smooth and the inside surface defining a plurality of barbed ridges extending longitudinally along the inside surface;
b. an elongated flange coextensive in length with the leg and having an undersurface and a top surface, the flange being joined to the leg to create respective leg and flange free edges; and
c. an upstanding elongated retainer section coextensive in length with the leg and flange and having an inside surface and an outside surface, the retainer section being joined to the leg to create a retainer section free edge, the retainer section outside surface being coplanar with the leg outside surface, wherein:

i. the flange is pivotally joined to the leg in a central region between the leg and retainer section to create a flange free edge and hinge end;

ii. the flange hinge end terminates in a tongue that is perpendicular to the plane of the flange; and iii. the central region between the leg and retainer section define a longitudinal groove adapted to receive the flange tongue, so that the flange can be selectively pivoted to an inoperative mode against the leg to thereby permit rolling the edging and to an operative mode extending at right angles to the leg and retainer section with the flange tongue engaged in the central section groove to thereby create a rigid structure.

9. The edging of claim 8 wherein the flange is pivotally joined to the leg at the junction of the flange undersurface and the leg inside surface, and wherein the flange tongue extends upwardly from the flange top surface at the flange hinge end.

10. The edging of claim 9 wherein:

a. the flange undersurface is approximately perpendicular to the leg inside surface when the flange tongue is engaged in the central region groove;

b. the flange top and undersurfaces diverge from the flange free edge toward the flange hinged end; and c. the retainer section outside and inside surfaces diverge from the free edge thereof toward the central region.

11. The edging of claim 10 wherein:

a. the leg is approximately 4.5 inches to 5 inches high;

b. the flange is approximately 3 inches wide between the free edge and hinge end;

c. the height of the retainer section is approximately 2 inches to 2.5 inches;

d. the flange thickness is approximately 0.06 inches at the free edge and approximately 0.25 inches at the hinged end; and e. the retainer section thickness is approximately 0.06 inches at the free edge and approximately 0.31 inches in the central region between the leg and retainer section.

12. A lawn and garden edging comprising:

a. a first piece comprising a leg, and a retainer generally coplaner with the leg and joined thereto at a central region to create respective retainer and leg free edges, the central region defining a longitudinal groove; and b. a second piece comprising a flange coextensive in length with the first piece and having a free edge and an inner end, the flange inner end terminating in a pair of opposed tongues extending approximately perpendicular to the plane of the flange, the tongues being adapted to slide within the groove of the first piece such that the plane of the second piece is approximately perpendicular to the plane of the first piece, so that the second piece tongues may be selectively disengaged from the first piece groove to thereby place the edging in an inoperative mode that enables the first and second pieces to be rolled and engaged in the first piece groove to thereby place the edging in a rigid operative mode wherein the second piece is approximately perpendicular to the first piece.

13. The edging of claim 12 wherein the leg of the first piece has an inside surface that defines at least one first barbed ridge that extends longitudinally along the inside surface and that protrudes approximately 0.13 inches therefrom and a second barbed ridge that protrudes approximately 0.25 inches from the leg inside surface, the second barbed ridge being adjacent the leg free edge.

14. The edging of claim 12 wherein the flange has an undersurface that is approximately perpendicular to the leg inside surface when the flange tongues are operatively engaged with the first piece groove, and wherein the flange has a top surface that diverges from the undersurface toward the inner end.

15. The edging of claim 14 wherein the retainer has inside and outside surfaces that diverge toward the first piece central region, and wherein the leg has inside and outside surfaces that diverge toward the first piece central region to thereby provide sufficient material at the central region to allow the groove to rigidly engage the flange tongues.

16. The edging of claim 14 wherein:

a. the leg is approximately 4.5 inches to 5 inches high between the leg free edge and the central region;

b. the fange is approximately 3 inches wide between the flange free edge and inner end;

c. the retainer is approximately 2 inches to 2.5 inches high from the retainer free edge to the central region;

d. the flange thickness is approximately 0.06 inches at the free edge and approximately 0.25 inches at the inner end; and e. the retainer and leg thicknesses are about 0.06 inches at the respective free edges and the first piece central region has a thickness of approximately 0.31 inches to thereby provide sufficient material in the first piece central region to firmly engage the groove with the flange tongues.

17. Apparatus for retaining selected materials within a bounded area and for impeding plant growth adjacent the area comprising:

a. a plurality of edgings, each edging comprising:

i. an elongated vertical leg having a smooth outside surface and an inside surface defining at least one barbed ridge extending longitudinaly along the leg;

ii. a flange coextensive in length with and joined to the leg and extending generally perpendicular thereto to thereby form respective free edges on the leg and flange; and iii. a retainer section coextensive in length with and upstanding from the junction of the leg and flange and having a smooth outside surface coplaner with the leg outside surface, the retainer section having a free edge, the edgings being placed in end facing contact with the planes of the legs intersecting at a predetermined angle of less than 180 degrees, the ends of the edgings being cut at an angle such that the ends converge from the flange free edge toward the leg and retainer section to thereby place the legs, flanges, and retainer sections of adjacent edgings in respective end facing contact,; and b. connector means for joining two adjacent edgings placed in end to end contact, so that edgings placed in end facing contact bound a multi-sided area.

18. The apparatus of claim 17 wherein:
   a. the flange has non-parallel under and top surfaces, the flange having a thickness of approximately 0.06 inches at the free edge and a thickness of approximately 0.25 inches at the junction with the retainer section and leg; and
   b. the retainer section has nonparallel inside and outside surfaces, the retainer section having a thickness of approximately 0.06 inches at the free edge and a thickness of approximately 0.25 inches at the junction of the flange and leg,
   so that the flange and retainer section provide strength, rigidity, and an attractive appearance.

19. The apparatus of claim 17 wherein the ends of the edgings are cut at an angle such that when the edging ends are placed in end facing contact the edgings entirely enclose a predetermined area.

20. The apparatus of claim 17 wherein the connector means comprises a connector piece that straddles the joints between adjacent edgings, the connector pieces being bent to the same angle as the edging ends.

21. The edging of claim 17 wherein the flange is removeably joined to the leg by a pair of tongues upstanding from the flange and a groove formed at the junction of the retainer and the leg, the groove being adapted to engage the flange tongues to rigidly join the flange to the leg and to disengage the flange tongues to thereby permit the leg and tongue to be separated and rolled.

22. Apparatus for retaining selected materials within a bounded area and for impeding plant growth adjacent the area comprising:
   a. a plurality of edgings, each edging comprising:
      i. an elongated vertical leg having a smooth outside surface and an inside surface defining at least one barbed ridge extending longitudinally along the leg;
      ii. a flange coextensive in length with and joined to the leg and extending generally perpendicular thereto to thereby form respective free edges on the leg and flange; and
      iii. a retainer section coextensive in length with and upstanding from the junction of the leg and flange and having a smooth outside surface coplaner with the leg outside surface, the retainer section having a free edge, the ends of the edgings being cut at an angle such that the ends converge from the flange free edge toward the leg and retainer section wherein
   the flange is pivotally joined to the leg by a hinge of material;
   the flange is formed with an upstanding tongue; and
   the region of the leg and retainer section junction defines a groove adapted to receive the flange tongue; and
   b. connector means for joining two adjacent edgings placed in end to end contact,
   so that the flange may be selectively pivoted about the hinge of material to disengage the flange tongue from the groove and place it against the leg for rolling the edging and to engage the flange tongue with the groove for creating the rigid edging.

* * * * *